(12) United States Patent
Schmidt et al.

(10) Patent No.: US 7,298,571 B1
(45) Date of Patent: Nov. 20, 2007

(54) METHOD AND A SYSTEM FOR MAINTAINING AN ACCEPTABLE LEVEL OF RELATIVE HUMIDITY INSIDE OF A DISK DRIVE

(75) Inventors: Stephen L. Schmidt, Milpitas, CA (US); Charles L. Taylor, Jr., San Jose, CA (US); Herman R. Wendt, Vista, CA (US); Farokh Ziari, Fremont, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 14 days.

(21) Appl. No.: 11/414,488

(22) Filed: Apr. 28, 2006

(51) Int. Cl.
  *G11B 15/18* (2006.01)
(52) U.S. Cl. ...................................... 360/69
(58) Field of Classification Search ............. 360/97.02
  See application file for complete search history.

(56) References Cited

U.S. PATENT DOCUMENTS

| | | |
|---|---|---|
| 4,642,715 A | 2/1987 | Ende |
| 5,907,454 A | 5/1999 | Ahn |
| 6,008,966 A | 12/1999 | Forbord et al. |
| 6,051,169 A | 4/2000 | Brown et al. |
| 6,296,691 B1 | 10/2001 | Gidumal |
| 6,643,914 B1 | 11/2003 | Xu |
| 6,765,753 B2 | 7/2004 | Takami |
| 6,785,082 B2 | 8/2004 | Fiorvanti et al. |
| 6,898,043 B2 | 5/2005 | Fioravanti |
| 7,046,469 B2 * | 5/2006 | Tanaka ..................... 360/69 |

FOREIGN PATENT DOCUMENTS

| | | |
|---|---|---|
| JP | 56068969 | 6/1981 |
| JP | 1092986 | 4/1989 |
| JP | 4291083 | 10/1992 |
| JP | 2000331458 | 11/2000 |
| JP | 2001110178 | 4/2001 |
| JP | 2001332047 | 11/2001 |
| JP | 2004127443 | 4/2004 |
| WO | WO-99/13460 | 3/1999 |

* cited by examiner

*Primary Examiner*—K. Wong

(57) ABSTRACT

Embodiments of the present invention pertain to maintaining an acceptable level of relative humidity inside of a disk drive. According to one embodiment, clean dry air is blow over a cover of the disk drive. The cover includes an unsealed servo write slot. The amount of clean dry air blown over the cover is regulated while a servo write process is performed so that a portion of the clean dry air is introduced into the disk drive.

20 Claims, 7 Drawing Sheets

METHOD AND A SYSTEM FOR MAINTAINING AN ACCEPTABLE LEVEL OF RELATIVE HUMIDITY INSIDE OF A DISK DRIVE

TECHNICAL FIELD

Embodiments of the present invention relate to manufacturing disk drives. More specifically, embodiments of the present invention relate to maintaining an acceptable level of relative humidity inside of a disk drive.

BACKGROUND

Disk drives are manufactured in clean rooms in order to prevent damage to the disk drives from particles getting inside of the disk drives. Disk drives are also subject to being damaged from electrostatic discharge (ESD), which is the discharge of electrostatic charge between components that have different potentials, during the manufacturing process. In order to minimize the possibility of ESD, the relative humidity inside of a clean room is typically maintained at approximately 55 percent.

However, it is desirable that the relative humidity inside of a disk drive after it has been manufactured is approximately 25 percent to 30 percent in order to avoid the failure of disk drive components, such as the magnetic read write heads, due to corrosion of the components. Desiccants are typically placed inside of disk drives in order to maintain a relative humidity of approximately 25 percent to 30 percent inside of the disk drive. However, since the clean room typically has a relative humidity of approximately 55 percent much of the life span of the desiccant is used up while the disk drive is being manufactured. Thus, the life of the disk drive is shortened.

FIG. 1 depicts a plan view of a prior art disk drive in order to facilitate the discussion of using desiccants inside of disk drives. The disk drive 110 includes a base casting 113, a motor hub assembly 130, a disk 112, actuator shaft 132, actuator arm 134, suspension assembly 137, a hub 140, voice coil motor 150, a magnetic read write head 156, a slider 155, and desiccant 160.

The components are assembled into a base casting 113, which provides attachment and registration points for components and sub assemblies. A plurality of suspension assemblies 137 (one shown) can be attached to the actuator arms 134 (one shown) in the form of a comb. A plurality of transducer heads or sliders 155 (one shown) can be attached respectively to the suspension assemblies 137. Sliders 155 are located proximate to the disk 112's surface 135 for reading and writing data with magnetic heads 156 (one shown). The rotary voice coil motor 150 rotates actuator arms 135 about the actuator shaft 132 in order to move the suspension assemblies 150 to the desired radial position on a disk 112. The desiccant 160 is typically placed near the voice coil motor 150. The actuator shaft 132, hub 140, actuator arms 134, and voice coil motor 150 may be referred to collectively as a rotary actuator assembly.

Data is recorded onto disk surfaces 135 in a pattern of concentric rings known as data tracks 136. Disk surface 135 is spun at high speed by means of a motor-hub assembly 130. Data tracks 136 are recorded onto spinning disk surfaces 135 by means of magnetic heads 156, which typically reside at the end of sliders 155.

FIG. 1 being a plan view shows only one head, slider and disk surface combination. One skilled in the art understands that what is described for one head-disk combination applies to multiple head-disk combinations, such as disk stacks (not shown). However, for purposes of brevity and clarity, FIG. 1 only shows on head and one disk surface.

SUMMARY OF THE INVENTION

Embodiments of the present invention pertain to maintaining an acceptable level of relative humidity inside of a disk drive. According to one embodiment, clean dry air is blow over a cover of the disk drive. The cover includes an unsealed servo write slot. The amount of clean dry air blown over the cover is regulated while a servo write process is performed so that a portion of the clean dry air is introduced into the disk drive

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
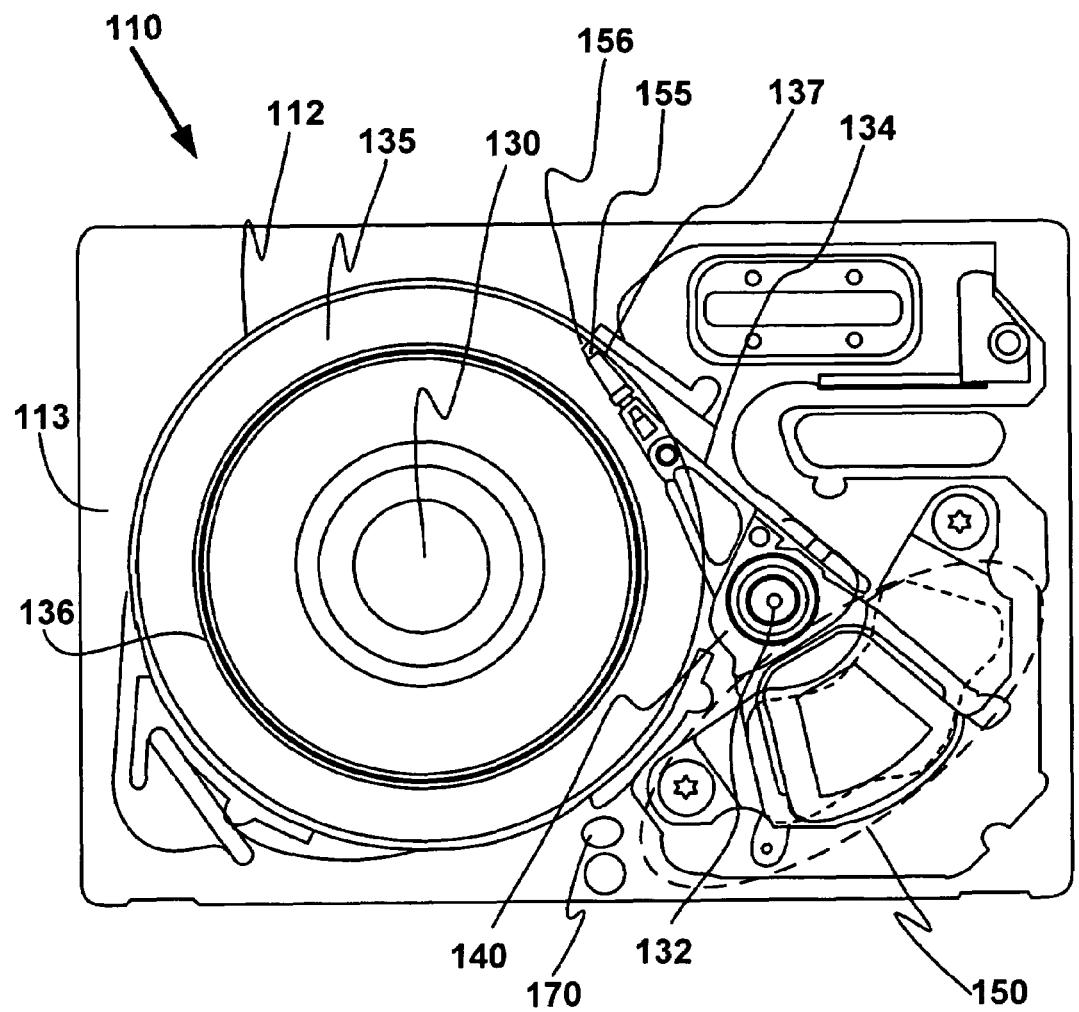
FIG. 1 depicts a plan view of a prior art disk drive in order to facilitate the discussion of using desiccants inside of disk drives.

The drawings referred to in this description should not be understood as being drawn to scale except if specifically noted.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

OVERVIEW

Various attempts have been made to solve the problem of the life span of a desiccant 160 ending prematurely. One solution has been to put a larger desiccant 160 inside of the disk drive 110. However, this has a couple of problems. One problem is that the amount of space inside of a disk drive 110 is limited and a larger desiccant 160 takes up space. A second problem is the additional expense involved in paying for more desiccants. A second solution has been to change the manufacturing process so that the desiccant 160 is placed in the disk drive 110 later in the manufacturing process. However, it was found that changing the manufacturing process was difficult and costly.

Circular track position information (CTPI) is typically written permanently to disks, for example at the manufacturers, to facilitate reading data from and writing data to the disks. The CTPI can include a pattern of radial positioning information. The radial position information is common referred to as "servo bursts" and the pattern of the radial position information is commonly referred to as a "servo pattern." The CTPI is used during operation of the disk drive 110 to ensure that the head 156 of the disk drive 110 is positioned over the desired track of data 136.

To avoid errors while reading or writing data, it is desirable that each track of data 136 be as close to a perfect circle that is centered on the disk as possible. Since the disk drive 110 uses the CTPI to determine where to write data to and/or to read data from, the placement of the CTPI on the disk 112 directly affects the placement of the tracks of data 136 on the disk 112.

The CTPI is written to a disk 112 using what is commonly known as a servo write process. A "pin" is used for moving the actuator 134 while writing the servo pattern the desired locations on a disk. The cover of a disk drive 110 has a slot which the pin can be inserted into. The "pin" is commonly known as a "servo write pin" and the slot is commonly known as the "servo write slot."

Typically, a desiccant 160 is removed from a sealed container and placed into a disk drive 110 prior to performing the servo write process. Typically, the servo write process takes 1 to 1.5 hours. As the servo write process is being performed, the desiccant 160 is absorbing the humidity in the clean room thus reducing the life span of the desiccant 160.

According to one embodiment, clean dry air is blown over the cover of the disk drive 110 while the servo write process is being performed. The spinning of the disk during the servo write process causes a portion of the clean dry air to be introduced into the disk drive 110. For example, the spinning of a disk 112 can cause clean dry air to be pulled into the disk drive 110. The clean dry air not only prevents the desiccant 160 from absorbing more humidity from the clean room servo write but also removes moisture from the desiccant 160, thus, extending the life span of the desiccant 160 as well as the disk drive 110. According to yet another embodiment, the clean dry air is also cleaner than the air in the clean room, which as will become more evident helps to reduce the probability of damage to the disk drive 110.

A Relative Humidity Maintenance System

Figure 2:
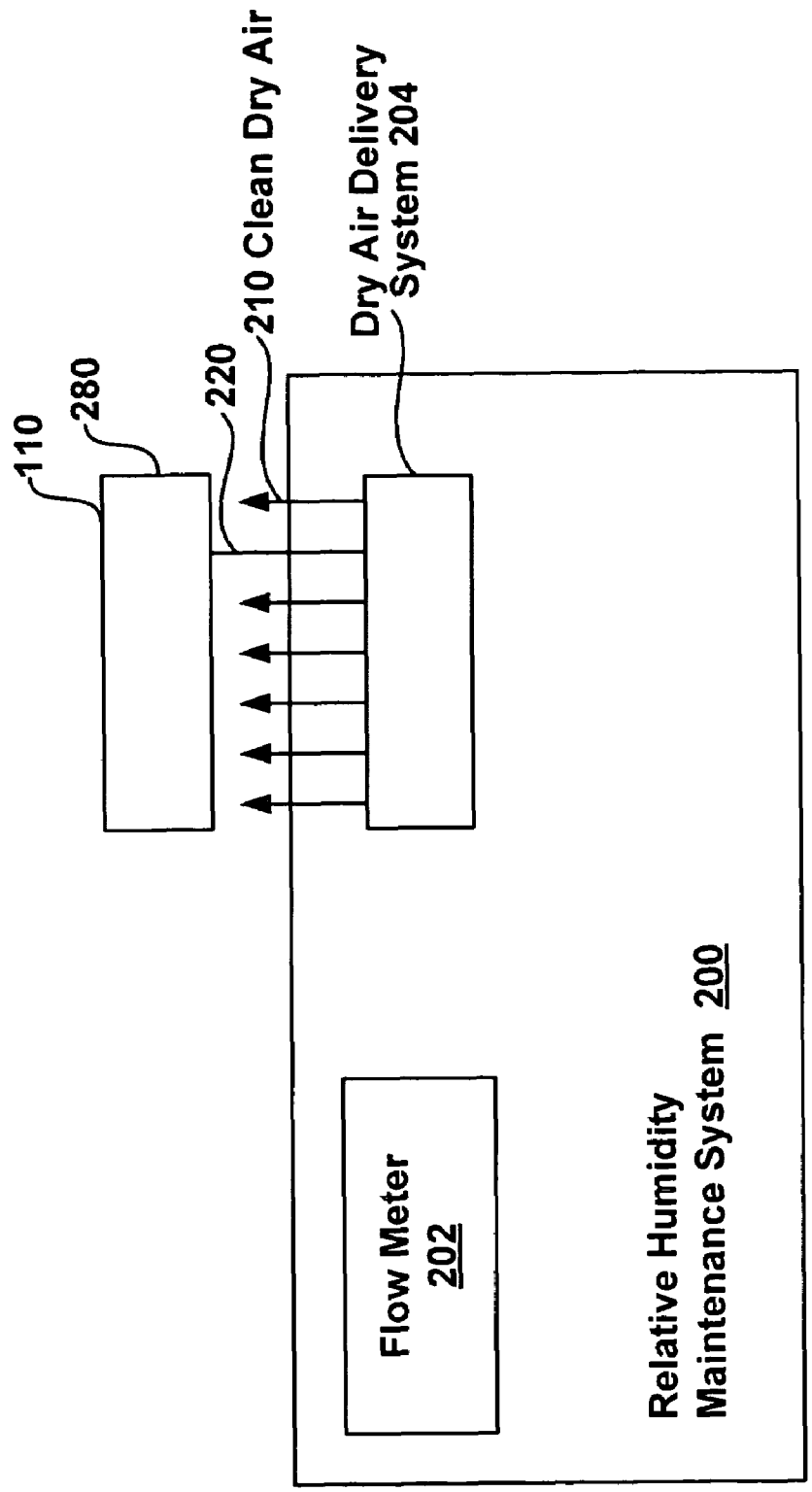
FIG. 2 depicts a relative humidity maintenance system for a disk drive, according to one embodiment.

FIG. 2 depicts a relative humidity maintenance system 200 for a disk drive 110, according to one embodiment. The relative humidity maintenance system 200 includes a flow meter 202 and a clean dry air delivery system 204. A disk drive 110 is positioned up side down over the clean dry air delivery system 204. The clean dry air delivery system 204 delivers clean dry air 210 over the cover 280 of the disk drive 110. The cover 280 includes an unsealed servo write slot, according to one embodiment. A servo write pin 220 that is proximate to the clean dry air delivery system 204 can be inserted into the unsealed servo write slot for the purpose of performing the servo write process. The flow meter 202 regulates the amount of clean dry air 210 that is blown over the cover 280 while the servo write process is being performed. The spinning of the disk inside of the disk drive 110 causes a portion of the clean dry air 210 to be introduced into the disk drive 100, for example by exchanging the air in the disk drive 110 with the clean dry air. For example, the spinning of a disk during the servo write process can cause clean dry air 210 to be pulled into the disk drive 110.

The disk drive 110 is associated with the servo write process by being placed in a servo write cell. The disk drive 110 is typically almost entirely assembled and has a cover 280 on before the servo write process begins. Further, the disk drive 110 is grounded while the disk drive 110 is in the servo write cell. Therefore, the disk drive 110 is much less likely to be subjected to unwanted ESD, thus, clean dry air 210 can be blown on the disk drive 110 without risking unwanted ESD.

According to one embodiment, the relative humidity of the clean dry air 210 is approximately 0. According to another embodiment, the distance between the dry air delivery system 204 and the disk drive 110 is approximately 2 millimeters (mm). According to yet another embodiment, the flow meter 202 uses a volumetric flow rate of approximately 0.7 liter atmospheres per minute as a part of regulating the amount of clean dry air 210. Too low a flow rate could reduce the effectiveness of the relative humidity maintenance system 200, however, too high a flow rate could reduce the effectiveness of the servo write process due to vibrations inside of the disk drive 110. An acceptable level of relative humidity inside of a disk drive 110 is approximately 25 percent to 30 percent, according to one embodiment. According to another embodiment, an acceptable level of relative humidity inside of a disk drive 110 is below 30 percent.

Figure 3:
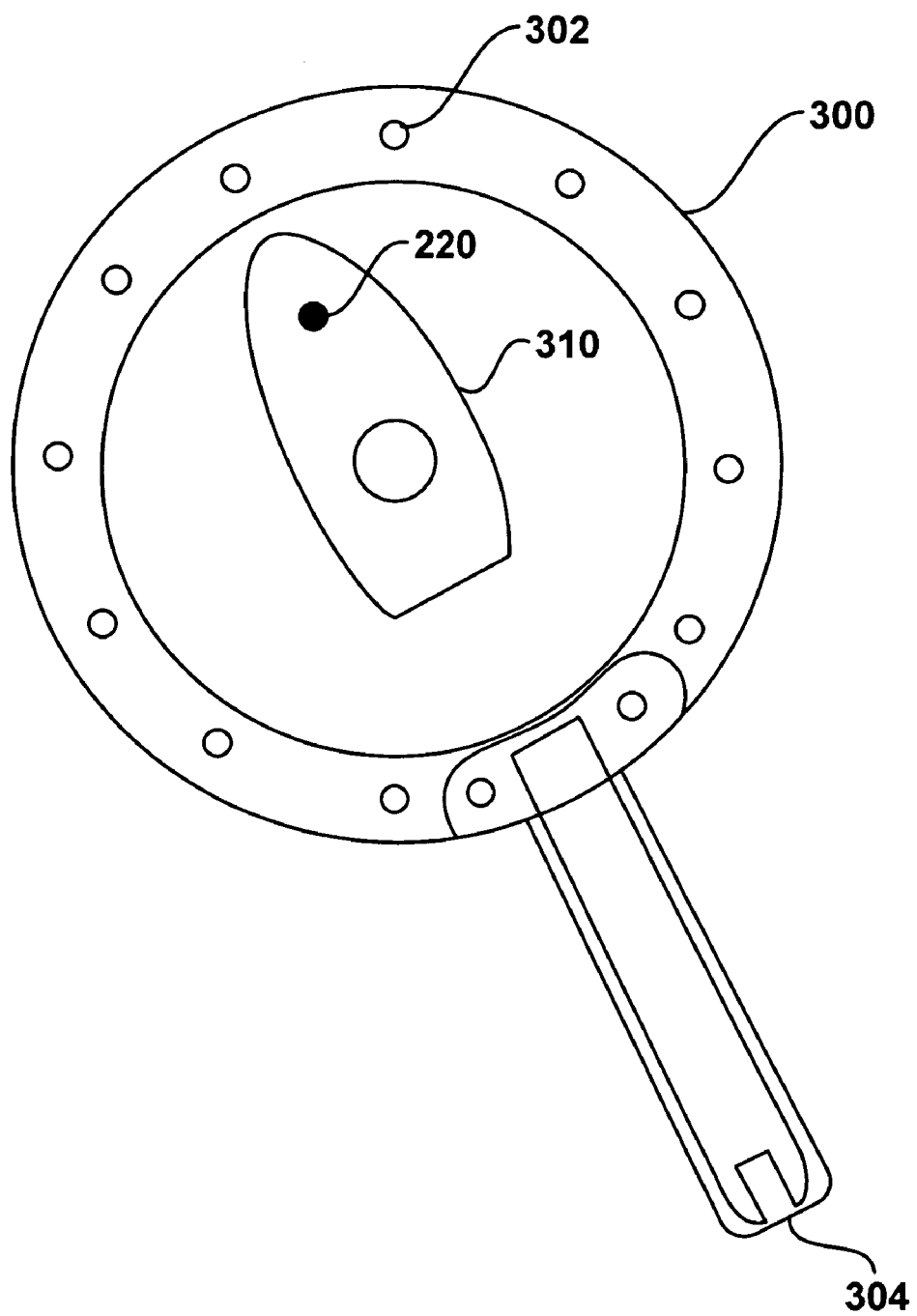
FIG. 3 depicts a top down view of a dry air delivery system that has been dropped into a servo write cell, according to one embodiment.

FIG. 3 depicts a top down view of a dry air delivery system 204 that has been dropped into a servo write cell, according to one embodiment. As depicted in FIG. 3 the clean dry air delivery system 204 is a purge ring 300. Clean dry air 210 can be introduced into the purge ring 300 at the end of the handle 304. The clean dry air 210 can come out of the holes 302 associated with the purge ring 300. According to one embodiment, the purge ring 300 may have approximately 20 holes. According to another embodiment, the purge ring 300 can be dropped into a servo write cell. When dropped into a servo write cell a part of a servo write system 310 is positioned inside of the purge ring 300. The part of the servo write system 310 includes a servo write pin 220 that can be used for positioning the actuator 134 at the appropriate locations on the disk 112 in order to write the servo pattern onto the disk 112.

Figure 4:
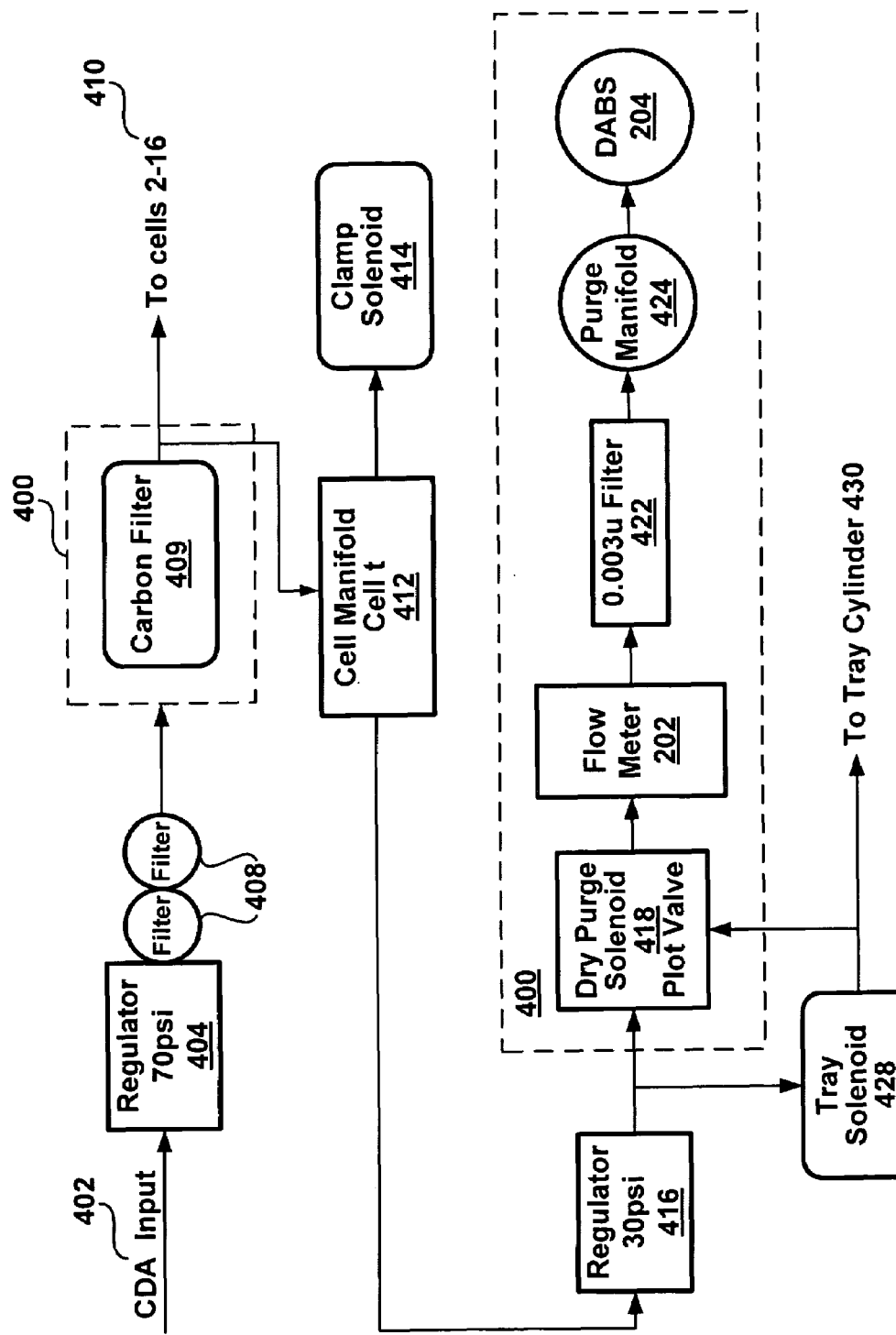
FIG. 4 depicts another relative humidity maintenance system that has been added to a legacy servo write system, according to another embodiment.

FIG. 4 depicts another relative humidity maintenance system 200 that has been added to a legacy servo write system, according to another embodiment. The relative humidity maintenance system 400 includes a carbon filter 409, pilot valve 418, a flow meter 202, another filter 422, a purge manifold 424, and a dry air delivery system 204. A servo write system typically supports 16 servo write cells. The servo write process can be performed asynchronously on disk drives associated with the plurality of servo write cells. FIG. 4 depicts a part of a legacy servo write system for the first servo write cell. The depicted part of the legacy servo write system, as depicted in FIG. 4, includes two regulators 404 and 416, two filters 408, a cell manifold 412, a clamp solenoid 414, and a tray solenoid 428. The clean dry air input 402 comes from a legacy system, such as a dry air solenoid. The carbon filter 409 can be used to filter vapors such as hydrocarbons. Then the air can go to a cell manifold 412 for servo write cell 1 and to servo write cells 2-16 as indicated by reference number 410. The clamp solenoid 414 can be used to clamp the disk drive 110 into place.

Referring to the relative humidity maintenance system 400, the pilot valve 418 can be used to turn the clean dry air 210 on or off. The pilot valve 418 can be a pipe fitted valve. According to one embodiment, a dry purge solenoid is used to implement the pilot valve 418. According to one embodiment, the pilot valve 418 is on only while a disk drive 110 is in servo write cell 1. Disk drives that are in various stages of assembly are in the clean room are still subject to unwanted ESD. Continuously purging clean dry air 210 could ultimately reduce the relative humidity inside of the clean room. The pilot valve 418 can reduce the exposure of the clean room to the clean dry air 210 used by the relative humidity maintenance system 400 since the pilot valve 418 can be used to turn the clean dry air 210 on and off.

The flow meter 202 can be used to regulate the amount of clean dry air 210 blown over a disk drive 110's cover 280. The filter 422 can be used to filter particles out of the clean dry air 210. According to one embodiment, the filter 422 is a 0.003 micron filter for filtering particles that are larger than 0.003 out of the clean dry air 210. The purge manifold can be used for adding another gaseous species, such as helium, to the clean dry air 210 that will ultimately be blown over a disk drive 110's cover 280 using a clean dry air delivery system 204, such as a purge ring. Blowing clean dry air 210 that includes helium over a disk drive 110's cover 280 results in fewer vibrations inside of the disk drive 110 during the servo write process, thus, the servo pattern is less likely to deviate from a perfect circle.

For example, deviation of a track of data from a perfect circle or off center can cause a track of data to come close to an adjacent track of data resulting in a loss of data during a write process. For example, assume that two tracks of data A and B are adjacent to each other on the disk and data has already been written to track of data A. At a particular point, while writing data to track of data B, the data on track of data A may be overwrite when the data for track B is written at a particular point, referred to as a "squeeze point," where the two adjacent tracks of data A and B are close together.

As already stated, the relative humidity maintenance system 400 depicted in FIG. 4 has been added to a legacy servo write system, according to one embodiment. Further the relative humidity maintenance system 400 includes various filters 409, 422 for providing air that is cleaner than the air found in a conventional class 100 clean room. Particles and vapors can, among other things, result in lose of data or permanent damage to a disk drive 110. For example, particles or vapors that come between the read write head and the surface 135 of the disk 112 can cause permanent damage to the disk's surface and/or loss of data. By using cleaner air, the disk drive 110 is subjected to fewer particles or vapors, thus the reliability of the disk drive 110 is increased and the life span of the disk drive 110 can be extended.

RESULTS

Figure 5:
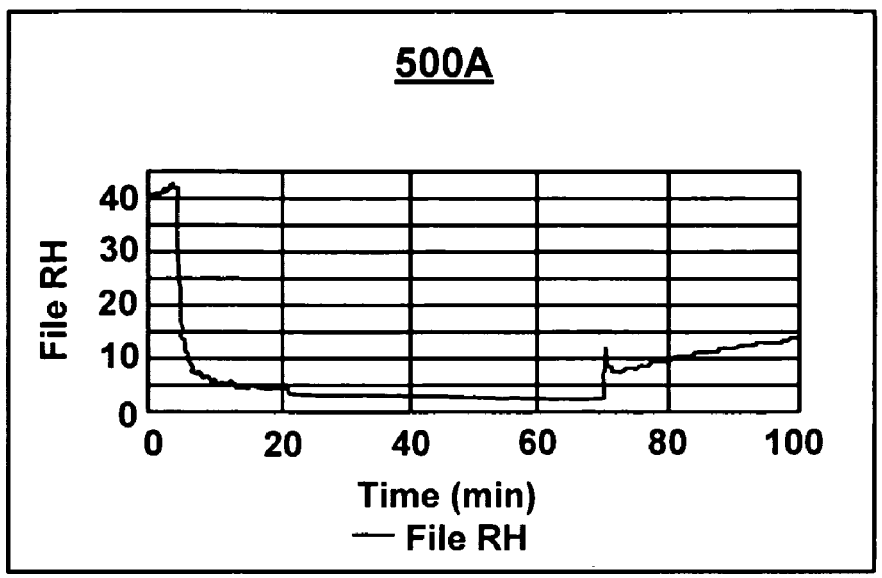
FIG. 5 depicts test results of the relative humidity inside of a disk drive over time using a relative humidity maintenance system, according to one embodiment of the present invention.
Figure 5:
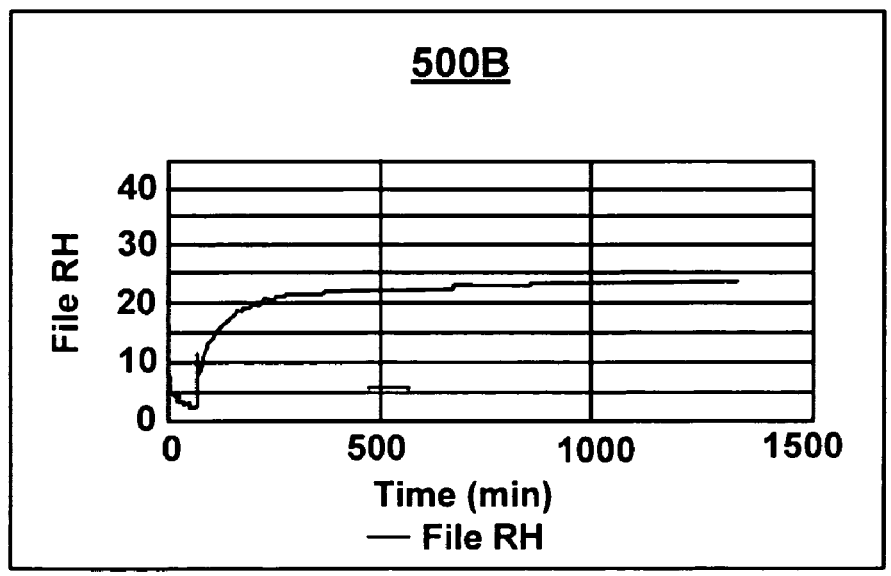

Typically the relative humidity inside of a clean room ranges from approximately 42 percent to 55 percent. Tests have shown that after the conventional servo write process approximately 55 percent of a desiccant 160's life span has been exhausted. Tests have also shown that the relative humidity inside of a disk drive 110 is approximately 25 percent to 30 percent when using a relative humidity maintenance system 200, according to various embodiments of the present invention. For example, FIG. 5 depicts test results of the relative humidity inside of a disk drive over time using a relative humidity maintenance system, according to one embodiment of the present invention. The x axis for graphs 500A and 500B represents time. The y axis for graphs 500A and 500B represents the relative humidity inside of the disk drive 110. As can be seen at time 0 the relative humidity is approximately 40 percent. However, the relative humidity quickly drops to approximately 20 percent. Typically the servo write process takes 1 hour to 1.5 hours. According to one embodiment, the servo write slot is usually sealed at approximately 70-80 minutes after the servo write process has been completed. Referring to graph 500A the relative humidity starts to stabilize at approximately 73 minutes. Referring to graph 500B, the relative humidity stabilizes at approximately 25 percent.

Figure 6:
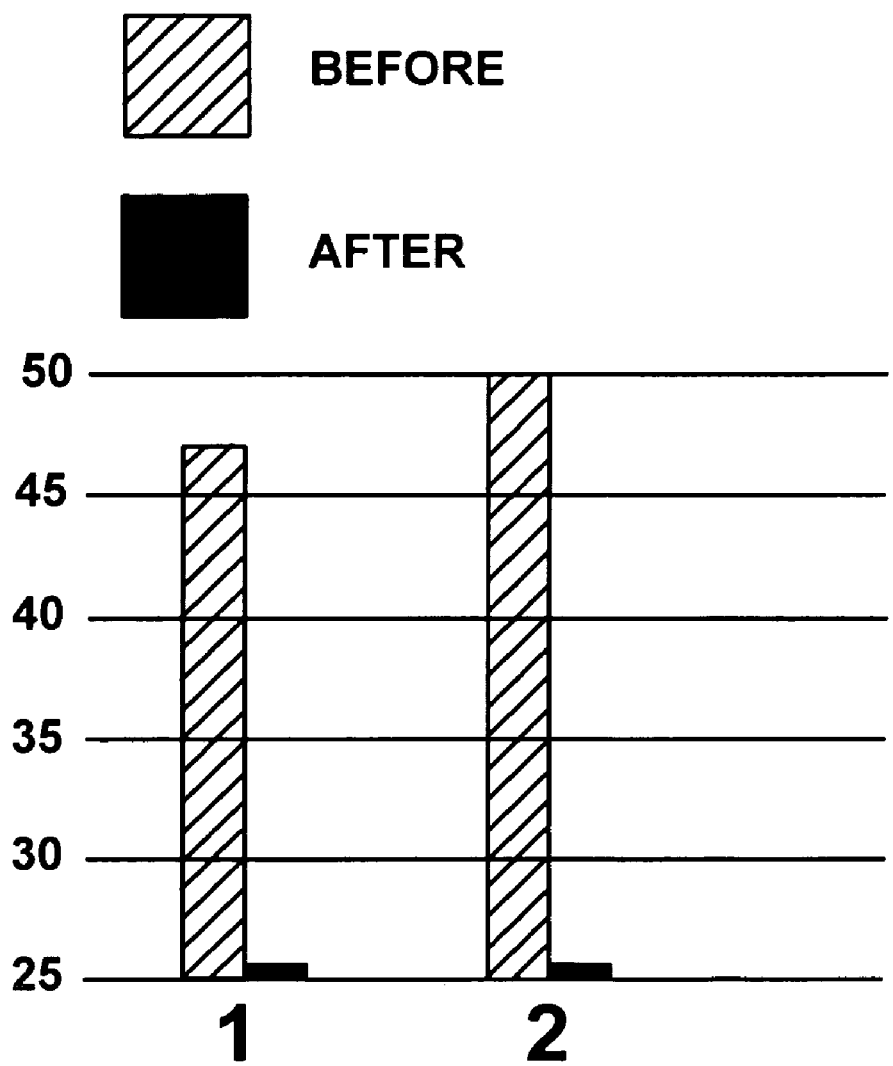
FIG. 6 depicts a bar graph indicating the relative humidity inside of a disk drive before using a relative humidity maintenance system and after the relative humidity maintenance system had been used during the servo write process, according to one embodiment.

FIG. 6 depicts a bar graph indicating the relative humidity inside of a disk drive 110 before using a relative humidity maintenance system and after the relative humidity maintenance system had been used during the servo write process, according to one embodiment. Before and after results are depicted for two disk drives 1 and 2. The relative humidity inside of disk drive 1 before using the relative humidity maintenance system 200, 400 is approximately 47 percent. After using the relative humidity maintenance system 200, 400 the relative humidity inside of disk drive 1 is approximately 26 percent. The relative humidity inside of disk drive 2 before using the relative humidity maintenance system 200, 400 is approximately 50 percent. However, after using the relative humidity maintenance system 200, 400 the relative humidity inside of disk drive 2 is approximately 26 percent. Not only would a relative humidity maintenance system 200, 400 prevent a desiccant 160 from absorbing moisture in the first place, but the relative humidity maintenance system 200, 400 can remove moisture that the desiccant 160 has already absorbed. By reducing the amount of moisture in the desiccant 160, various embodiments of the present invention can be used to proactively prevent moisture related failures of disk drive 110 components, such as disk drive head failures.

As stated before, an acceptable level of relative humidity inside of a disk drive 110 is approximately 25 percent to 30 percent, according to one embodiment. According to another embodiment, an acceptable level of relative humidity inside of a disk drive 110 is below 30 percent. As can be seen from the graphs depicted in FIGS. 5 and 6, a relative humidity maintenance system 200, 400 is very effective in reducing the relative humidity to an acceptable level inside of a disk drive 110.

Figure 7:
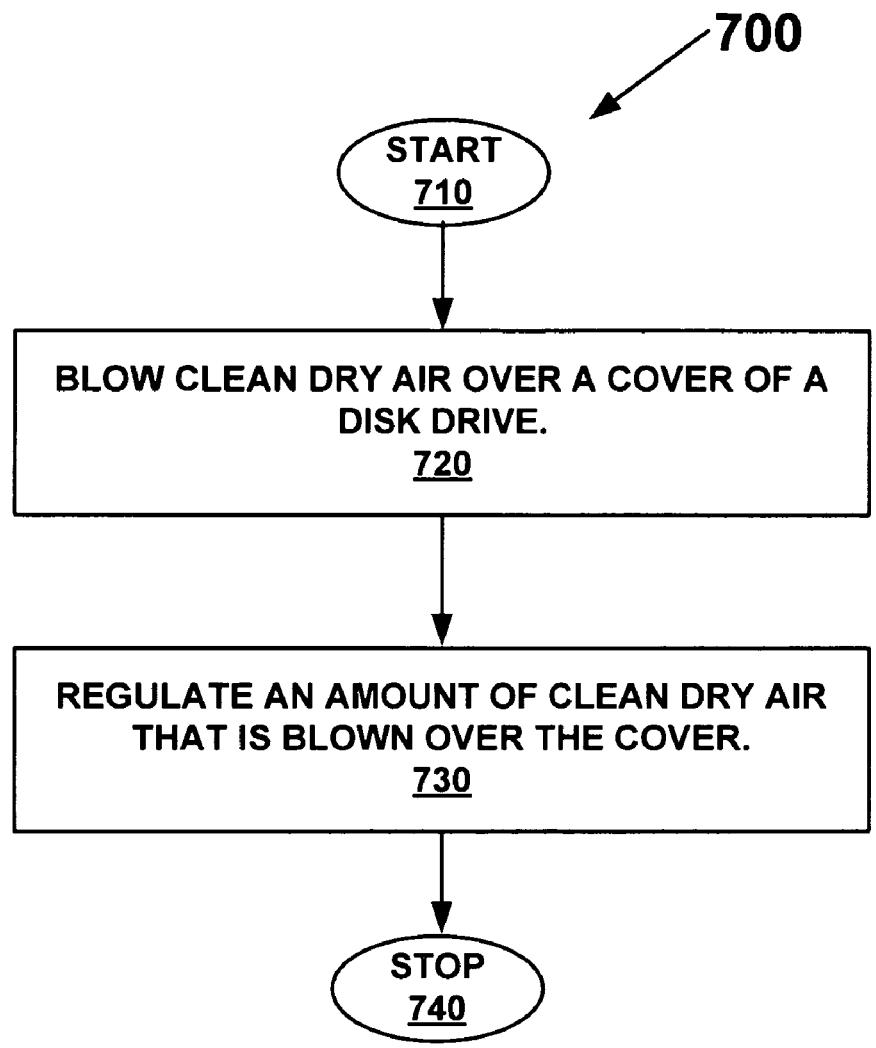
FIG. 7 depicts a flowchart describing a method of maintaining an acceptable level of relative humidity inside of a disk drive, according to one embodiment of the present invention.

Operational Example of a Method of Sealing an Enclosure for a Small Form Factor Hard Disk Drive FIG. 7 depicts a flowchart 700 describing a method of maintaining an acceptable level of relative humidity inside of a disk drive, according to one embodiment of the present invention. Although specific steps are disclosed in flowchart 700, such steps are exemplary. That is, embodiments of the present invention are well suited to performing various other steps or variations of the steps recited in flowchart 700. It is appreciated that the steps in flowchart 700 may be performed in an order different than presented, and that not all of the steps in flowchart 700 may be performed.

All of, or a portion of, the embodiments described by flowchart 700 can be implemented using computer-readable and computer-executable instructions which reside, for example, in computer-usable media of a computer system or like device. As described above, certain processes and steps of the present invention are realized, in one embodiment, as a series of instructions (e.g., software program) that reside within computer readable memory of a computer system and are executed by the of the computer system. When executed, the instructions cause the computer system to implement the functionality of the present invention as described below.

The hard disk drive assembly process up to the servo write process has been performed in preparation for maintaining an acceptable level of relative humidity inside of a disk drive 110 as depicted in flowchart 700, for example during the servo write process.

At 710, the process begins.

At step 720, clean dry air is blown over a cover of a disk drive. For example, a relative humidity maintenance system 200, 400 could be used to blow clean dry air 210 over a cover 280 of a disk drive 110. The cover 280 includes an unsealed servo write slot into which the clean dry air 210 can be introduced. The disk drive 110 could be positioned upside down over a clean dry air delivery system 204. Clean dry air 210 could come out of a clean dry air delivery system 204, such as a purge ring 300, so that the clean dry air 210 is blown over the disk drive 110's cover 280.

At step 730, an amount of clean dry air that is blown over the cover is regulated. For example, a flow meter 202 as depicted in FIG. 2 or FIG. 4 could be used to regulate the amount of clean dry air 210 that is blown over the cover 280. The clean dry air 210 is blown over the cover 280 while performing a servo write process so that a portion of the clean dry air 210 is introduced into the disk drive 110. The flow meter 202 regulates the amount of clean dry air 210 that is blown over the cover 280 while the servo write process is being performed. The spinning of the disk 112 inside of the disk drive 110 causes a portion of the clean dry air 210 to be introduced into the disk drive 110. For example, the spinning of a disk 112 during the servo write process can cause clean dry air 210 to be pulled into the disk drive 110 and exchanged with the air inside of the disk drive enclosure.

At 740, the process ends.

After the servo write process is completed, an operator selects the cell to unload the disk drive 110 from, according to one embodiment. In the conventional servo write process, the disk drive 110 was automatically unloaded from a cell. However, this caused a delay in the amount of time before a manufacturing employee could seal the servo write slot, thus, exposing the desiccant 160 to the high humidity in the clean room. However, by having the operator select the cell to unload the disk drive 110, the servo write slot can be sealed much more quickly. For example, it may take only 5-10 minutes before the servo write slot could be sealed due to an operator selecting a cell for unloading the disk drive 110.

After the servo write slot is sealed, a particle count is typically taken through a particle count hole in the cover 280 of the disk drive 110. According to one embodiment, clean dry air 210 can also be introduced into the disk drive 110 through the unsealed particle count hole as well as the servo write slot, for example during step 730. The disk may be spun and the actuator 134 moved back in forth in order to loosen any particles inside of the disk drive 110 as a part of performing a particle count. Then the particle count hole is sealed and a leak test is performed on the disk drive 110. As a part of the leak test, air may be pumped into a make up filter in order to determine whether the disk drive 110 leaks. Then typically the disk drive manufacturing process is complete.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for maintaining an acceptable level of relative humidity inside of a disk drive, the method comprising:
   blowing clean dry air over a cover of the disk drive, wherein the cover includes an unsealed servo write slot; and
   regulating the amount of clean dry air blown over the cover while performing servo write process so that a portion of the clean dry air is introduced into the disk drive.

2. The method as recited in claim 1, wherein the blowing of the clean dry air further comprises:
   blowing clean dry air that has a relative humidity of approximately 0 percent.

3. The method as recited in claim 1, wherein the blowing of the clean dry air further comprises:
   Blowing clean dry air that is cleaner than the air in a class 100 clean room.

4. The method as recited in claim 1, wherein the regulating of the amount of clean dry air blown over the cover further comprises:
   using a flow rate of approximately 0.7 liters per minute.

5. The method as recited in claim 1, further comprising:
   unloading the disk drive from a servo write cell as a result of receiving an operator initiated selection of the servo write cell that the disk drive is in.

6. The method as recited in claim 1, wherein the method further comprises further comprises:
   enabling the ability to turn the blowing of the clean dry air on and off.

7. A relative humidity maintenance system for a disk drive, the relative humidity reducing system comprising:
   a clean dry air delivery system that delivers clean dry air over a cover of the disk drive, wherein the cover includes an unsealed servo write slot; and
   a flow meter for regulating the amount of clean dry air blown over the cover while performing servo write process so that a portion of the clean dry air is introduced into the disk drive.

8. The relative humidity maintenance system of claim 7, wherein the relative humidity maintenance system further comprises:

a carbon filter for filtering vapors out of the clean dry air before the clean dry air is blown over the cover.

9. The relative humidity maintenance system of claim 7, wherein the relative humidity maintenance system further comprises:
a 0.003 micron filter for filtering particles that are larger than 0.003 microns out of the clean dry air before the clean dry air is blown over the cover.

10. The relative humidity maintenance system of claim 7, wherein the relative humidity maintenance system further comprises:
a pilot valve for turning the blowing of the clean dry air on or off.

11. The relative humidity maintenance system of claim 7, wherein the relative humidity maintenance system further comprises:
a purge manifold for adding other gaseous species to the clean dry air before the clean dry air is blown over the cover.

12. The relative humidity maintenance system of claim 7, wherein the other gaseous species is helium.

13. The relative humidity maintenance system of claim 7, wherein the clean dry air delivery system is a purge ring.

14. The relative humidity maintenance system of claim 7, wherein there is a distance of approximately 2 millimeters (mm) between the cover of the disk drive and the clean dry air delivery system.

15. The relative humidity maintenance system of claim 7, wherein the flow meter uses a flow rate of approximately 0.7 liters per minute to regulate the amount of clean dry air that blows over the cover.

16. The relative humidity maintenance system of claim 7, wherein the clean dry air has a relative humidity of approximately 0 percent.

17. The relative humidity maintenance system of claim 7, wherein the clean dry air is cleaner than the air in a class 100 clean room.

18. A relative humidity maintenance system for a disk drive, the relative humidity reducing system comprising:
means for blowing clean dry air over a cover of the disk drive, wherein the cover includes an unsealed servo write slot; and
means for regulating the amount of clean dry air blown over the cover while performing servo write process so that a portion of the clean dry air is introduced into the disk drive.

19. The relative humidity maintenance system of claim 18, wherein the relative humidity maintenance system further comprises:
means for filtering vapors out of the clean dry air before the clean dry air is blown over the cover.

20. The relative humidity maintenance system of claim 18, wherein the relative humidity maintenance system further comprises:
means for adding other gaseous species to the clean dry air before the clean dry air is blown over the cover.

* * * * *